United States Patent [19]

Weiler et al.

[11] 4,179,766
[45] Dec. 25, 1979

[54] WIPING ARRANGEMENT FOR WIPING A VEHICLE WINDOW

[75] Inventors: Paul Weiler, Kappelrodeck; Dietmar Brümmer, Bühlertal, both of Fed. Rep. of Germany

[73] Assignee: Robert Bosch GmbH, Stuttgart, Fed. Rep. of Germany

[21] Appl. No.: 930,980

[22] Filed: Aug. 4, 1978

[30] Foreign Application Priority Data

Sep. 17, 1977 [DE] Fed. Rep. of Germany ....... 2742021

[51] Int. Cl.² .............................................. B60S 1/40
[52] U.S. Cl. .................................................. 15/250.32
[58] Field of Search .......................... 15/250.31–250.35

[56] References Cited
U.S. PATENT DOCUMENTS

| | | | |
|---|---|---|---|
| 1,994,738 | 3/1935 | Ritz-Woller | 15/250.32 |
| 2,798,244 | 7/1957 | Nesson | 15/250.32 |

FOREIGN PATENT DOCUMENTS

| | | | |
|---|---|---|---|
| 2057213 | 9/1971 | Fed. Rep. of Germany | 15/250.32 |
| 1235573 | 5/1960 | France | 15/250.32 |

Primary Examiner—Peter Feldman
Attorney, Agent, or Firm—Michael J. Striker

[57] ABSTRACT

A wiping arrangement for wiping a vehicle window has a wiper arm having a free bifurcated end portion which defines a gap extending lengthwise of the arm, a wiping blade, an element for connecting the wiping blade with the wiper arm in response to sliding entry of the element into the gap, and an element for disconnecting the wiping blade from the wiper arm to permit its separation therefrom. The connecting element has two projecting sections which are biased apart from one another and toward prong sections of the wiper arm. One of the projecting sections of the connecting element has an engaging formation which engages this an engaging formation of one of the prong sections of the wiper arm. Thereby the connecting element and the wiping blade secured thereto become connected with the wiper arm. The disconnecting element includes a handle provided on one projecting portion of the connecting element and extending outwardly beyond the prong sections of the wiper arm. The handle portion urges the one projecting section of the connecting element toward the other projecting section thereof so that the engaging formations become disengaged from one another, whereby the connection of the connecting element and the wiping blade with the wiper arm is interrupted. After this, the wiping blade can be withdrawn from the wiper arm without removing the latter from a vehicle window.

17 Claims, 2 Drawing Figures

WIPING ARRANGEMENT FOR WIPING A VEHICLE WINDOW

BACKGROUND OF THE INVENTION

The present invention relates to a wiping arrangement for wiping a vehicle window.

Wiping arrangements for wiping a vehicle window have been proposed in the art, which arrangements include means for compressing a U-shaped arm of a connecting element to thereby disconnect a wiping blade from a wiper arm. This means is accessible only in the case when the wiper arm with the wiping blade are swung out of the vehicle window. However, this is impossible in the cases when a shaft of the arrangement is blocked, for instance in the type of arrangement which is concealed in wiper arm parking position.

SUMMARY OF THE INVENTION

Accordingly, it is an object of the present invention to provide a wiping arrangement for wiping a vehicle window, which avoids the disadvantages of the prior art.

More particularly, it is an object of the present invention to provide a wiping arrangement for wiping a vehicle window, wherein a wiping blade can be withdrawn from a wiper arm without removing the latter from its operational position.

In keeping with these objects and with others which will become apparent hereinafter, one feature of the present invention resides, briefly stated, in a wiping arrangement for wiping a vehicle window which comprises a wiping element, a driven arm element having a forked free end portion which includes two prong sections bounding a gap therebetween, and connecting means for releasably connecting the wiping element with the arm element and including a connecting element which is secured to the wiping element and located in the gap of the end portion of the arm element and which has two projecting sections biased apart from one another and toward the prong sections of the arm element, wherein at least one of the projecting sections of the connecting element has an engaging formation arranged for engaging with an engaging formation of one of the prong sections of the arm element, and one of the projecting sections of the connecting element has a handle portion which extends outwardly beyond the prong sections of the arm member and arranged for urging the one projecting section so that the above-mentioned engaging formations become disengaged from one another. When the projecting sections of the connecting element are biased toward the prong sections of the arm element and the engaging formations engage one another, the wiping element is reliably connected to the arm element. On the other hand, when the handle portion of the connecting element urges the latter so that the engaging formations become disengaged from one another, the wiping element together with the connecting element can be easily withdrawn from the gap of the end portion of the arm element of the arrangement.

In such a construction, the wiping element can be withdrawn from the arm element in the operational position of the arm element, and the latter needs not to be removed from the vehicle window.

The wiping element has an axle, and the connecting element is pivotably connected to the axle. The engaging formations of the connecting element and the arm element may be formed as a hole and an engaging projection arranged for engaging in the hole.

In accordance with another feature of the present invention, the forked end portion of the arm element may be so constructed that one of the prong sections is formed by the arm element itself, whereas the other prong section is formed by an additional element associated with the end portion of the arm element. The additional element may be fixedly connected to the arm element, and may have an intermediate section and two end sections which are spaced from one another and extend in planes which are offset relative to one another.

In accordance with still another feature of the present invention, the additional element may be S-shaped and is so constructed that the end sections thereof are spaced from one another in the direction of elongation of the additional element, whereas the planes in which the end sections are located may be offset relative to one another in a direction which is transverse to the direction of elongation of the additional element. One of the end sections of the additional element may form one of the prong sections of the other element, whereas the other element section may be provided with fixing means for fixing the additional element to the arm element.

In accordance with a further feature of the present invention, a housing member formed as a hood may be provided in the arrangement, and one of the projecting sections of the connecting element may be fixedly connected to the housing member. More particularly, the one projecting section of the connecting element may be fixedly connected to opposite walls of the housing member. On the other hand, the projecting section of the connecting element may be movable between the walls of the housing member relative to the first-mentioned projecting portion of the connecting element.

In accordance with a still further feature of the present invention, the connecting element may be formed of one piece with the housing member so as to form together an integral member. Preferably, such an intergral member may be constituted by a synthetic plastic material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
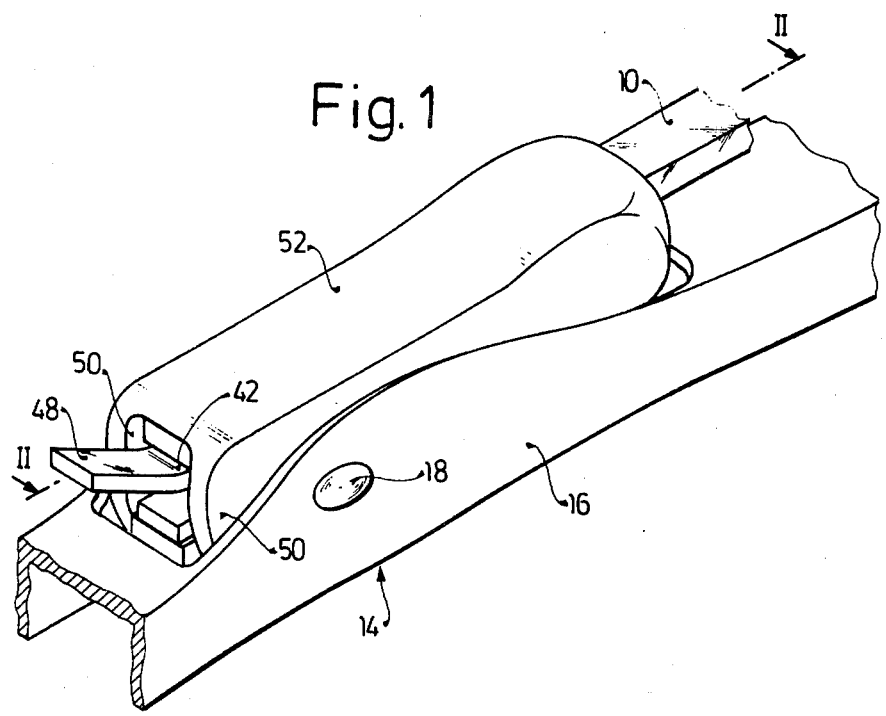
FIG. 1 is a partial perspective view showing a connection of a wiper arm with a wiping blade.

A wiping arrangement for wiping a vehicle window in accordance with the present invention has a wiper arm which is identified by reference numeral 10 and has a free end portion 12, and a wiping blade which is identified by reference numeral 14 and is pivotally connected to the free end portion 12 of the wiper arm 10. The wiping blade 14 has a supporting portion 16 provided with an axle or pivot 18. The wiping arm 14 is pivotally connected with the wiper arm 10 by means of the above-mentioned axle 18.

Figure 2:
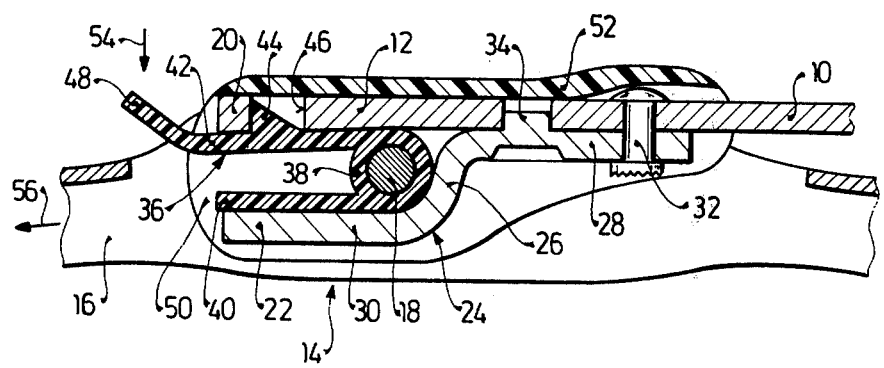
FIG. 2 is a view showing a section taken along line II—II of FIG. 1.

The free end portion 12 of the wiper arm 10 is bifurcated and has two prongs 20 and 22. The bifurcated construction of the free end portion 12 of the wiper arm 10 is formed by the free end portion 12 itself and an additional S-shaped element 24 associated with the free end portion 12, as shown in FIG. 2. The additional element 24 has a central section 26 and two end sections 28 and 30 which extends from the central section 36 in mutually opposite directions. The central section 26 is formed by offsetting of the additional element 24, so that the end sections 28 and 30 are located in two planes which are spaced from one another. The end portion 28 of the additional element 24 has an arresting projection 34 which is engaged in a hole of the free end portion 12 of the wiper arm 10. At the same time, the end section 28 of the additional element 24 is secured to the end portion 12 of the wiper arm 10 by a rivet 32. The prong 20 of the bifurcated end of the wiper arm is formed by the free end portion 12 of the latter, whereas the other prong 22 is formed by the section 30 of the additional element 24.

As can be seen from FIG. 2 a connecting element 36 is pivotally arranged on the axle 18 of the supporting portion 16 of the wiping blade 14. The connecting element 36 is substantially U-shaped. A main section 38 of the connecting element 36 has a hole through which the axle 18 extends. Two projecting sections 40 and 42 of the connecting element 36 are connected with the main section 38. The prongs 20 and 22 of the wiper arm 10 have inner surfaces facing toward one another. The projecting sections 40 and 42 of the connecting element 36 have outer surfaces, i.e., surfaces facing away from one another, which are biased toward the inner surfaces of the prongs 20 and 22 of the wiper arm 10 due to the connection of the sections 40 and 42 with the main section 38.

The projecting section 42 of the connecting element 36 is provided with engaging projection 44 which engages in a hole 46 of the prong 20 of the wiper arm 10 in operational condition of the arrangement. Thereby, a positive connection is provided between the connecting element 36 and the wiper arm 10. The projecting section 42 of the connecting element 36 has an extension or handle section 48 which extends outwardly beyond the prongs 20 and 22 of the wiper arm 10.

A U-shaped housing member or hood 52 is provided. The projecting portion 40 of the connecting element 33 is of one piece with opposite walls 50 of the hood 52. On the other hand, the projecting section 42 of the connecting element 36 is freely movable between the walls 50 of the hood 52 relative to the projecting portion 40. The connecting element 36 together with the hood 52 may form an integral member which may be manufactured in one operational step. Such an integral member is preferably constituted of a synthetic plastic material.

The above described arrangement operates in the following manner. In order to disconnect the wiper arm 10 and the wiping blade 14, the handle section 48 of the connecting element 36 is urged in the direction of arrow 54 until the engaging projection 44 will be withdrawn from the hole 46. Thereupon the wiping blade 14 together with the connecting element 36 pivotally connected thereto can be withdrawn out of the prongs 20 and 22 of the bifurcated end portion 12 of the wiper arm 10, by moving the former in the direction of arrow 56.

When the wiping blade 14 is connected with the wiper arm 10, the wiping blade 14 together with the connecting element 36 must be so positioned relative to the gap formed between the prongs 20 and 22 of the wiper arm 10, that the main portion 38 of the connecting element 36 is located in front of the gap and the projecting portions 40 and 42 of the connecting element 36 extend in a substantially horizontal direction. After this, the axle 18 and the main portion 38 of the connecting element are inserted into the gap between the prongs 20 and 22 of the wiper arm 10, whereby the projecting sections 40 and 42 of the connecting element 36 are resiliently urged toward one another. Then, the engaging projection 44 is engaged in the hole 46 of the prong 20 of the wiper arm 10. In this position, which is shown in FIG. 1, the projecting sections 40 and 42 of the U-shaped connecting element 36 are biased toward the inner faces of the prongs 20 and 22 of the wiper arm 10.

It is believed to be evident that when a wiping arrangement is constructed in accordance with the present invention, the wiper arm 10 needs not to be swung from its operational position either for removing the wiping blade 14 from the wiper arm 10 or for connecting the wiping blade 14 with the wiper arm 10. The handle section 48 of the connecting element 36 is readily accessible, and the wiping blade 14 must be moved only in such a plane which is substantially corresponds to the wiping plane of the arrangement.

It will be understood that each of the elements described above, or two or more together, may also find a useful application in other types of constructions differing from the types described above.

While the invention has been illustrated and described as embodied in a wiping arrangement for wiping a vehicle window it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A wiping arrangement for wiping a vehicle window, comprising a wiping element; a driven arm element having a forked free end portion which includes two prong sections bounding a gap therebetween and having first surfaces facing toward one another, at least one of said prong sections having a first engaging formation; and connecting means for releasably connecting said wiping element with said arm element, said connecting means including a connecting element which is secured to said wiping element and located in said gap of said end portion of said arm element, said connecting element having two projecting sections which are biased apart from one another and toward said prong sections of said arm element, said projecting sections of said connecting element having second surfaces which face away from one another and each of which abuts against a respective one of said first surfaces of said prong sections of said arm element, at least one of said projecting sections of said connecting element having a second engaging formation arranged for engaging with said first engaging formation of said one prong section of said arm element whereby said connecting element and said wiping element secured thereto become connected with said arm element, said connecting means including a handle portion provided on said one projecting section of said connecting element, said handle portion extending outwardly beyond said prong sections of said arm element and arranged for urging said one projecting section of said connecting element toward the other projecting section thereof so that said engaging formations become disengaged from one another, whereby said connection of said connecting element and said wiping element with said arm element is interrupted and said wiping element can be withdrawn from said arm element without removing the latter from a vehicle window.

2. A wiping arrangement as defined in claim 1, wherein said wiping element has an axle, said connecting element being pivotally connected to said axle.

3. A wiping arrangement as defined in claim 1, wherein said first engaging formation is a hole and said second engaging formation is a projection which is arranged for engaging in said hole.

4. A wiping arrangement as defined in claim 1, wherein said prong sections of said arm element include a first and a second prong sections, said first prong section being of one piece with a remainder portion of said arm element; and further comprising an additional element associated with said end portion of said arm element and forming said second prong section of said arm element.

5. A wiping arrangement as defined in claim 4, wherein said additional element is fixedly connected to said arm element; and further comprising fixing means for fixedly connecting said additional element to said arm element.

6. A wiping arrangement as defined in claim 5, wherein said additional element has two end sections which are spaced from one another and extend in planes which are offset relative to one another.

7. A wiping arrangement as defined in claim 6, wherein said additional element is elongated, said end sections being spaced from one another in the direction of elongation of said additional element, whereas said planes are offset relative to one another in aa direction which is transverse to the direction of elongation of said additional element.

8. A wiping arrangement as defined in claim 6, wherein one of said end sections of said additional element forms said second prong section of said arm element, whereas the other end section is provided with said fixing means and thereby fixed to said arm element.

9. A wiping arrangement as defined in claim 6, wherein said additional member has an intermediate section which is located between said end sections and connects the latter with one another, said end sections of said additional element extending from said intermediate section in mutually opposite directions.

10. A wiping arrangement for wiping a vehicle window, comprising a wiping element; a driven arm element having a forked free end portion which includes two prong sections bounding a gep therebetween, at least one of said prong sections having a first engaging formation; connecting means for releasably connecting said wiping element with said arm element, said connecting means including a connecting element which is secured to said wiping element and located in said gap of said end portion of said arm element, said connecting element having two projecting sections which are biased apart from one another and toward said prong sections of said arm element, at least one of said projecting sections of said connecting element having a second engaging formation arranged for engaging with said first engaging formation of said one prong section of said arm element whereby said connecting element and said wiping element secured thereto become connected with said arm element, said connecting means including a handle portion provided on said one projecting section of said connecting element, said handle portion extending outwardly beyond said prong sections of said arm element and arranged for urging said one projecting section of said connecting element toward the other projecting section thereof so that said engaging formations become disengaged from one another, whereby said connection of said connecting element and said wiping element with said arm element is interrupted and said wiping element can be withdrawn from said arm element without removing the latter from a vehicle window; and a housing member, said other projecting section of said connecting element being fixedly connected to said housing member.

11. A wiping arrangement as defined in claim 10, wherein said housing member has walls located opposite to one another, said other projecting section of said connecting element being fixedly connected to said opposite walls of said housing member.

12. A wiping arrangement as defined in claim 11, wherein said one projecting section of said connecting element is movable relative to said other projecting section thereof and between said walls of said housing member.

13. A wiping arrangement as defined in claim 10, wherein said one projecting section of said connecting element is movable relative to said housing member so as to move relative to said other projecting section of said connecting element.

14. A wiping arrangement as defined in claim 10, wherein said housing member is formed as a hood.

15. A wiping arrangement as defined in claim 14, wherein said hood has a U-shaped cross section.

16. A wiping arrangement as defined in claim 10, wherein said connecting element is of one piece with said housing member so as to form together an integral member.

17. A wiping arrangement as defined in claim 16, wherein said integral member is constituted by a synthetic plastic material.

* * * * *